United States Patent
Magley, II

(10) Patent No.: US 8,727,187 B2
(45) Date of Patent: May 20, 2014

(54) VENTED SPOUT

(71) Applicant: Robert E. Magley, II, Waterloo, IN (US)

(72) Inventor: Robert E. Magley, II, Waterloo, IN (US)

(*) Notice: Subject to any disclaimer, the term of this patent is extended or adjusted under 35 U.S.C. 154(b) by 0 days.

(21) Appl. No.: 13/940,536

(22) Filed: Jul. 12, 2013

(65) Prior Publication Data

US 2013/0299522 A1    Nov. 14, 2013

Related U.S. Application Data

(63) Continuation-in-part of application No. 13/192,636, filed on Jul. 28, 2011, now abandoned.

(51) Int. Cl.
*B65D 47/32* (2006.01)

(52) U.S. Cl.
USPC .................. 222/481.5; 222/527; 222/568

(58) Field of Classification Search
USPC ............... 222/481.5, 527, 567, 568, 528, 530
See application file for complete search history.

(56) References Cited

U.S. PATENT DOCUMENTS

| | | | |
|---|---|---|---|
| 1,436,708 A | 11/1922 | Goebel | |
| 1,454,803 A | 5/1923 | Wells | |
| 2,545,350 A | 3/1951 | Fuld | |
| 2,556,627 A * | 6/1951 | Miksis | 222/568 |
| 2,861,604 A | 11/1958 | Whitmire | |
| 3,338,482 A | 8/1967 | Jordan | |
| 3,901,417 A | 8/1975 | Schiemann | |
| 3,986,538 A * | 10/1976 | Sather | 141/332 |
| 4,583,668 A * | 4/1986 | Maynard, Jr. | 222/529 |
| 4,588,111 A | 5/1986 | Hestehave | |
| 4,597,513 A | 7/1986 | Schiemann | |
| 4,600,125 A * | 7/1986 | Maynard, Jr. | 222/81 |
| 4,832,238 A * | 5/1989 | Taylor | 222/529 |
| 5,020,702 A * | 6/1991 | James | 222/529 |
| 5,133,482 A * | 7/1992 | Burrows et al. | 222/185.1 |
| 5,232,110 A | 8/1993 | Purnell | |
| 5,395,278 A * | 3/1995 | Dickhut | 446/486 |
| 5,406,994 A | 4/1995 | Mitchell et al. | |
| 5,688,397 A | 11/1997 | Malmborg | |
| 5,711,355 A | 1/1998 | Kowalczyk | |
| D399,048 S | 10/1998 | Sayre | |
| 5,934,522 A * | 8/1999 | Canela et al. | 222/527 |
| 5,967,201 A * | 10/1999 | Gasior | 141/98 |
| D491,664 S | 6/2004 | Patzer | |
| 7,971,761 B1 * | 7/2011 | Kudlu | 222/481.5 |

(Continued)

FOREIGN PATENT DOCUMENTS

FR    2904610 A1    8/2008

OTHER PUBLICATIONS

European Search Report dated Jun. 11, 2012 for European Patent Application No. EP 12 15 7668 (8 pages).

*Primary Examiner* — Kevin P Shaver
*Assistant Examiner* — Donnell Long
(74) *Attorney, Agent, or Firm* — Taylor IP, P.C.

(57) ABSTRACT

A fluid container including a container having an opening and a spout assembly connected to the opening. The spout assembly is connectable to the opening. The spout assembly includes a cap, first and second tubular portions, and at least one corrugated portion. The cap is securable so as to substantially cover the opening. The first tubular portion is connected to the cap. The at least one corrugated portion is fluidically coupled between the first tubular portion and the second tubular portion. The second tubular portion being insertable into the first tubular portion.

17 Claims, 3 Drawing Sheets

(56) References Cited

U.S. PATENT DOCUMENTS

| | | |
|---|---|---|
| 2005/0274749 A1* | 12/2005 | Labossiere .................... 222/527 |
| 2010/0230447 A1 | 9/2010 | Erikson |
| 2011/0132939 A1 | 6/2011 | Brooks |
| 2012/0085792 A1* | 4/2012 | Carriere ........................ 222/527 |
| 2013/0140334 A1* | 6/2013 | Abell ............................ 222/527 |

* cited by examiner

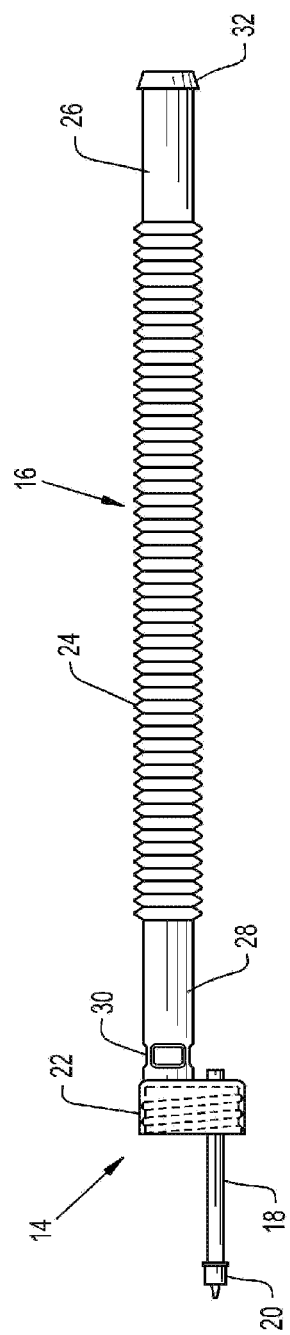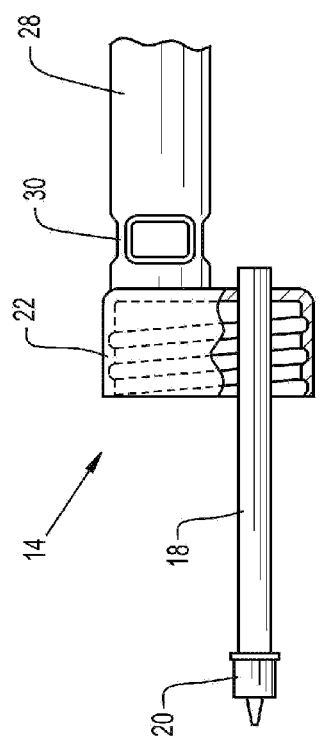

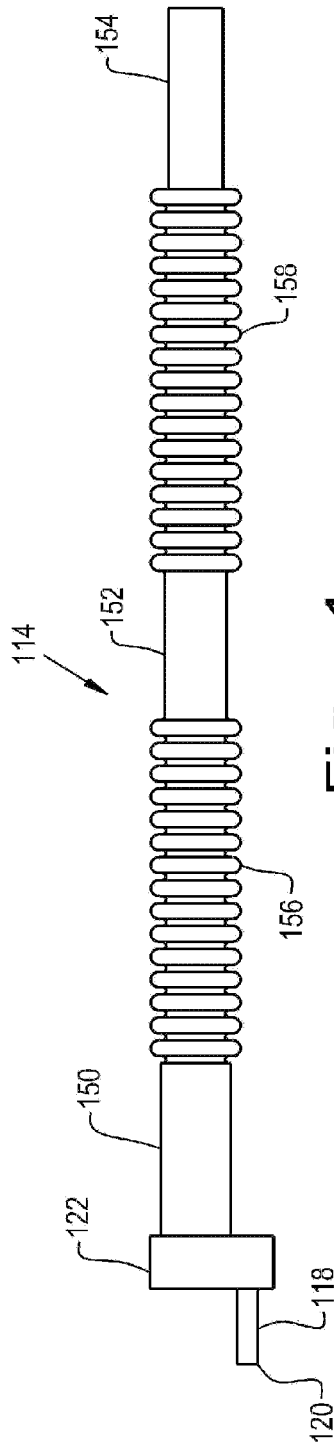
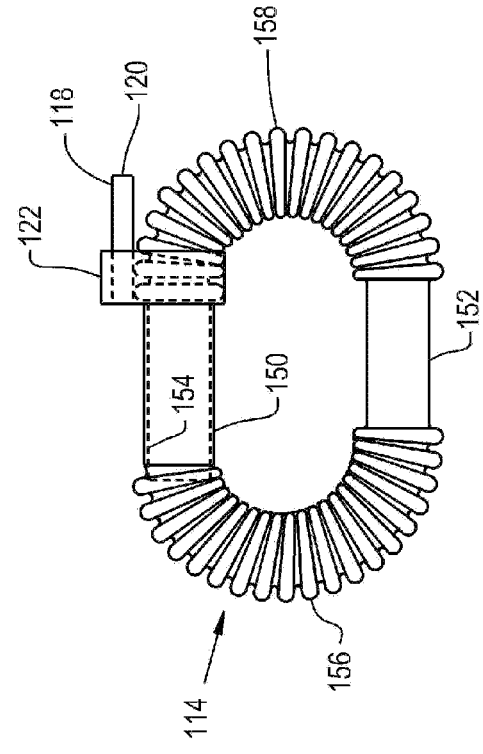
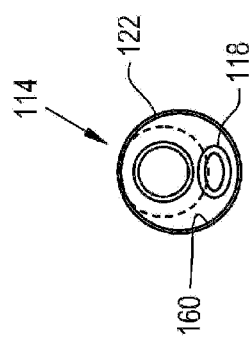

VENTED SPOUT

CROSS REFERENCE TO RELATED APPLICATIONS

This is a continuation-in-part of U.S. patent application Ser. No. 13/192,636 entitled "VENTED SPOUT", filed Jul. 28, 2011, which is a non-provisional application based upon U.S. provisional patent application Ser. No. 61/451,429, entitled "VENTED SPOUT", filed Mar. 10, 2011, both of which are incorporated herein by reference.

BACKGROUND OF THE INVENTION

1. Field of the Invention

The present invention relates to a liquid container having a spout, and, more particularly, to a vented spout that is connectable to a liquid container.

2. Description of the Related Art

Liquid containers generally include a spout or a pouring protrusion to facilitate the directing of the liquid to an intended receiving vessel. It is known in U.S. Pat. No. 1,436,708 to provide a pouring nozzle for bottles including a stopper having a pouring orifice therethrough. U.S. Pat. No. 1,454,803 discloses a dispensing vessel including a can body having a closed top and a pouring spout secured to the top of the can. A vent tube extends parallel to the spout and extends slightly beyond the outer end of the spout. The inner side of the vent tube extends into a box-like valve casing having an opening or port in its lower side. When the can is tilted to pour its contents out through the spout, the valve rolls out of a seat toward the end of the vent tube. A pin is arranged in the valve casing immediately in front of the end of the tube.

U.S. Pat. No. 3,338,482 discloses a dispensing bottle having a pouring spout. A channel of the spout narrows rapidly as it proceeds upwardly and makes an angular turn having an opening through which the liquid being poured passes. A small, hollow air bleeder is positioned within the spout.

U.S. Pat. No. 3,901,417 discloses a device for venting of jerry cans having a tube that is not quite horizontal. A free end of the tube terminates close before a rear wall of the can. By way of the dimensioning, the free end is practically always within an air bubble when the can is discharged by pouring in the usual manner, so that air streaming through the end does not have to bubble through the liquid in order to reach the large air bubble.

U.S. Pat. No. 4,588,111 discloses a vented pouring spout having a venting tube provided within the pouring spout. The venting tube is positioned so as to extend from an outlet end that projects slightly from the outlet end of the spout member, to an inlet end that extends from an inlet end and is directed generally upwardly so that a free end thereof will be located within the air space formed in the container above the fluid level. The vent tube is attached within the pouring passage by way of a clip.

U.S. Pat. No. 4,597,513 discloses a pourer pipe having venting passages that lie opposite to each other. The vent passages are arranged symmetrically in relation to a plane.

U.S. Pat. No. 5,711,355 discloses a portable liquid transfer container and dispensing nozzle with a non-movable part free flow, vapor recovery and overfill prevention system including an airtight rigid container. A dispensing nozzle is fastened to the container. A flexible internal conduit is attached to the dispensing nozzle at its top end with fillets extending to about one-half of the dispensing nozzle opening. An internal conduit extends from the top tip of the dispensing nozzle, through the nozzle, and into the top and back of the container.

DES. 399,048 is a design patent that discloses what appears to be a bite valve shown in FIGS. 5 and 6 connected to a supply tube as shown in FIG. 4. In FIGS. 1-3, there is illustrated a vent plug that is in an extended position in FIGS. 1 and 3 and in a closed position in FIG. 2.

D491,664 discloses a vented contrast media reservoir cap assembly (FIGS. 1-13) and is a design patent that illustrates a sealable opening and a vented hole having offset air passageways to interior of the container.

Patent Application Publication No. U.S. 2010/0230447 discloses a pour spout with a drip suppressing feature including a first circular aperture that is smaller than the second circular aperture and is aligned with a bore of a vent tube. The vent tube has a first end adjacent an interior surface of a disk portion and extends through the interior of the hollow cylindrical portion and the hollow intermediary portion to a second end located outside the hollow cylindrical portion. As liquid is dispensed from the bottle through the second circular aperture, the vent tube allows air to enter the bottle, equalizing the pressure within the bottle and preventing the contents of the bottle from backing up and pouring out in an uneven manner.

What is needed in the art is a flexible vent tubing that is part of the cap and provides for quick efficient transfer of the liquid from a container and allows for self-nesting of the spout apart from the container.

SUMMARY OF THE INVENTION

The present invention is directed to a vented spout with a vent tube that is substantially covered by the liquid during dispersal of the liquid from the container and is self-storing when not connected to the fluid container.

The present invention consists in one form thereof as a fluid container including a container having an opening and a spout assembly connected to the opening. The spout assembly is connectable to the opening. The spout assembly includes a cap, first and second tubular portions, and at least one corrugated portion. The cap is securable so as to substantially cover the opening. The first tubular portion is connected to the cap. The at least one corrugated portion is fluidically coupled between the first tubular portion and the second tubular portion. The second tubular portion being insertable into the first tubular portion.

The present invention consists in another form thereof as a spout assembly having a cap, first and second tubular portions, and at least one corrugated portion. The cap is securable so as to substantially cover the opening of a fluid container. The first tubular portion is connected to the cap. The at least one corrugated portion is fluidically coupled between the first tubular portion and the second tubular portion. The second tubular portion being insertable into the first tubular portion.

The present invention consists in yet another form thereof as a method of nesting ends of a spout assembly including the steps of substantially inserting a second tubular portion of a spout into a first tubular portion of the spout; and interfering a portion of the spout assembly with another portion of the spout assembly to thereby retain the second tubular portion inside of the first tubular portion.

An advantage of the present invention is that the vent allows for only ingress of air into the fluid.

Another advantage of the present invention is that the vent is connected to the spout assembly.

Yet another advantage of the present invention is that the air inlet tube does not reduce the pouring orifice cross section which would result in a reduced flow rate.

Still yet another advantage is that the present invention is configured to allow one end of the spout assembly to nest inside of an opposite end, thereby enhancing the storage, packaging and keeping the distal end of the spout clean.

BRIEF DESCRIPTION OF THE DRAWINGS

The above-mentioned and other features and advantages of this invention, and the manner of attaining them, will become more apparent and the invention will be better understood by reference to the following descriptions of embodiments of the invention taken in conjunction with the accompanying drawings, wherein:

FIG. 2 is a side view of the vented spout of FIG. 1;

FIG. 3 is a partially sectioned close-up view of the vented spout of FIGS. 1 and 2.

FIG. 4 is a side view of another embodiment of a pouring spout used with the container of FIG. 1;

FIG. 5 is an end view of the pouting spout of FIG. 4; and

FIG. 6 is a view of the pouring spout of FIGS. 4 and 5 in a nested configuration.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION OF THE INVENTION

Figure 1:
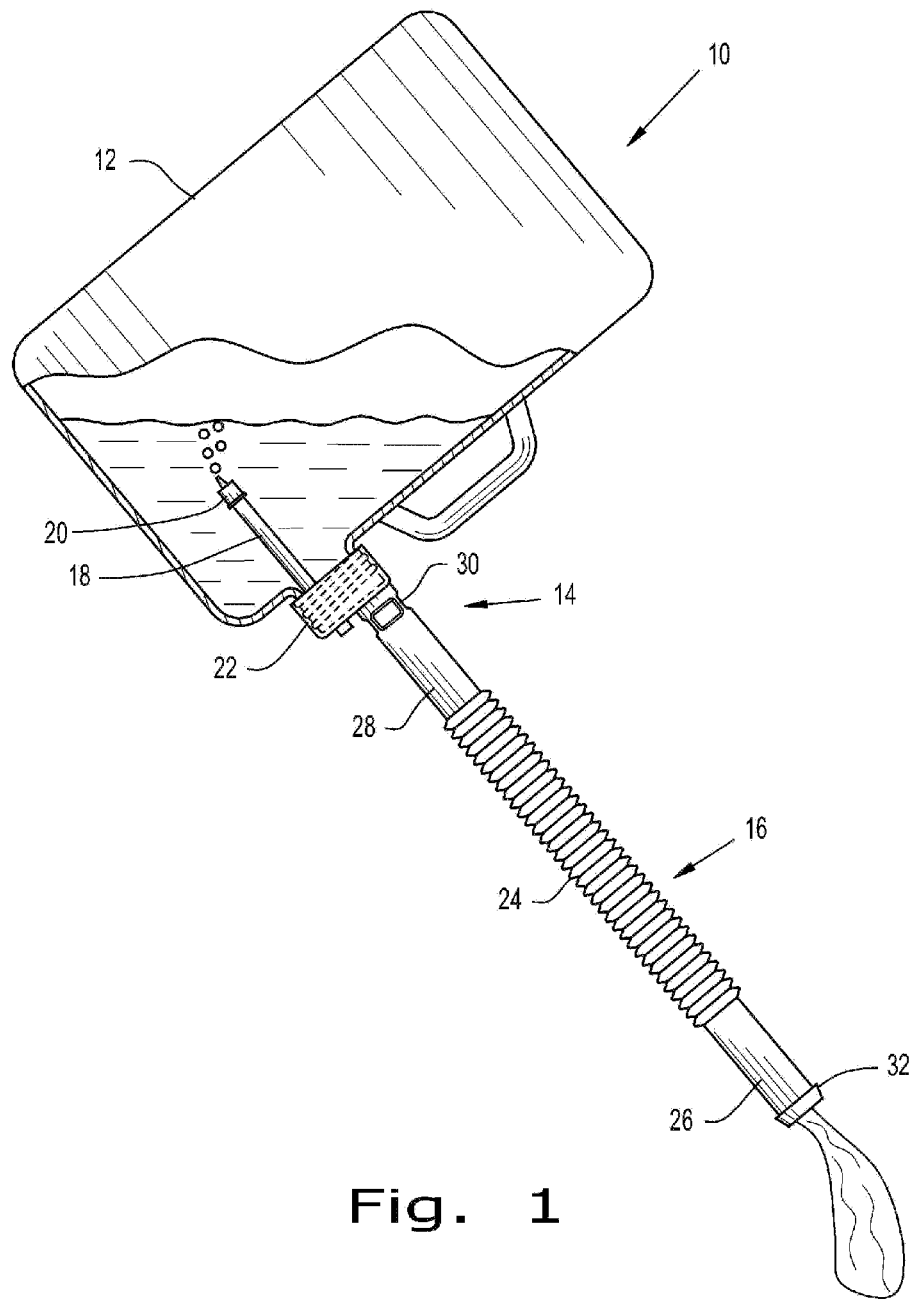
FIG. 1 is a partially sectioned side view of a liquid container with an embodiment of a vented spout of the present invention.

Referring now to the drawings, and more particularly to FIG. 1 there is illustrated a fluid distribution system 10 including a container 12 with a spout assembly 14. Spout assembly 14 allows for the ingress of air into container 12 while fluid in the container passes therefrom.

Now additionally referring to FIGS. 2 and 3, spout assembly 14 has a discharge passage 16, an air ingress tube 18, a one-way valve 20 and a cap 22. Discharge passageway 16 includes a corrugated portion 24, non-corrugated portions 26 and 28, a retaining feature 30 and a retained end 32. Discharge passage 16 allows fluid from container 12 to egress to a desired location chosen by the user. While the fluid is escaping a slight vacuum occurs within the container thereby causing air to flow through air ingress tube 18, through one-way valve 20 and into the fluid. The air of course rises and joins the air already in container 12.

Spout assembly 14 is configured to be attached to a jug or other pour container such as container 12. It has been discovered that the length of air ingress tube 18 needs to be sufficiently long enough to allow the air passing therethrough to not enter the fluid flow stream going through portions discharge passage 16.

Cap 22 covers the opening of container 12 with portion 28 and air ingress tube 18 connected to cap 22. In the embodiment shown cap 22 is threaded to accommodate a threaded portion of container 12. Although other connection configurations are also contemplated.

Corrugated portion 24 allows for a robust flexibility of spout assembly 14, while portions 26 and 28 are smooth and retain a certain resilient rigidity. Cap 22 is configured such that portion 28 may be offset from the center of cap 22, thereby allowing room for air ingress tube 18 to be part of spout assembly 14. Check valve 20 may be a simple check valve, such as a rubber duckbill valve effectively preventing the escape of fluid therethrough yet allowing air to pass therein.

Discharge passage 16 has a cross-sectional area that is larger than the cross-sectional area of air ingress tube 18. This is in recognition that the fluid passing through discharge passage 16 is less compressible than air and that the air passing through air ingress tube 18 can move with less restriction in the flow. Air ingress tube 18 as well as valve 20 are not connected to nor are they in contact with the container, except of course indirectly by way of cap 22. Rather air ingress tube 18 and valve 20 resiliently flexibly extend from cap 22 inside of container 12 and are generally substantially submerged in the fluid as it is poured from container 12. Of course as the level of the fluid drops portions of air ingress tube 18 and valve 20 may be exposed to air inside of container 12. Air inside of air ingress tube 18 provides some degree of buoyancy to tube 18 causing it to flex somewhat toward the surface of the fluid, which advantageously reduces the pressure difference needed for air to pass through valve 20. Air ingress tube 18 has a length that is greater than the diameter of discharge passage 16. Discharge passage 16 may be longer than air ingress tube 18, with each extending on opposite sides of cap 22. There is no limit on the length of ingress tube 18, but generally a length that allows valve 20 to extend substantially into the fluid of a full normally positioned container is preferred.

FIG. 3 shows an expanded view of cap 22. The present invention advantageously allows for the venting of an unvented container, such as a fuel container so that it can be easily retrofit to unvented containers and can be stored separately when not in use. Retained end 32 can be routed back around and enter into a portion of portion 28 being secured by an indentation thereon shown as retaining feature 30. This helps keep the interior of discharge passage 16 from being contaminated.

If check valve 20 were to be located on or adjacent to cap 22, since vent tube 18 only directs the flow of air away from the flow of fluid as it moves toward the spout, it would not vent very well. It has been found that the best venting occurs the farther into the container that check valve 20 is located. For example, consider the fluid in the container, at the very start of the pouring cycle. Nothing has yet come out of the spout and there is no vacuum built up in the container. At this moment, the fluid head pressure helps seal check valve 20 closed. As fluid comes out the spout, the vacuum in the container increases to such a point that the ambient air pressure overcomes the fluid head pressure, opening check valve 20, and allowing air to enter the container and lessen the vacuum. The less fluid head pressure on check valve 20, the sooner the air in valve 20 overcomes the head pressure and allows the air into the container.

Now, additionally referring to FIGS. 4-6 there is shown another embodiment of a spout assembly, here for purposes of understanding, similar elements are numbered with 100 added to the reference numbers for similar parts introduced above. Spout assembly 114 further includes tubular portions 150, 152 and 154 with corrugate portions 156 and 158 connected therebetween. Tubular portions 150, 152 and 154 are substantially cylindrical in shape and each have a diameter with the diameter of tubular portion 150 being the largest and the diameter of tubular portion 154 being smaller that the diameter of tubular portion 150 to thereby allow tubular portion 154 to be inserted into tubular portion 150, as shown in FIG. 6. Further, tubular portion 152 has a diameter that is between that of tubular portions 150 and 154. More specifically, the inner diameter of tubular portion 150 is larger than the outer diameter of tubular portion 154.

Cap 122 has internal threads 160 which allow cap 122 to be secured to container 12 When tubular portion 154 is inserted into tubular portion 150 at least one of the corrugations of corrugated portion 158 contacts threads 160, and even flexibly interferes with threads 160. This interfering contact serves to help retain tubular portion 154 in tubular portion 150. Tubular portion 154 may additionally be longer that the length of tubular portion 150 allowing a distal end of tubular portion 154 to contact the inner portions of at least one corrugation of corrugated portion 156, as shown in FIG. 6. This arrangement may additionally help retain tubular portion 154 in the position shown in FIG. 6. Still further, the resiliency of spout assembly 114 is such that an angular force is applied between tubular portions 150 and 154 and this angular force coupled with the coefficient of friction therebetween also aids in the retention of tubular portion 154 inside of tubular portion 150.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A fluid container, comprising:
   a container having an opening; and
   a spout assembly connectable to said opening, said spout assembly including:
      a cap securable to substantially cover said opening;
      a first tubular portion connected to said cap;
      a second tubular portion; and
      at least one corrugated portion fluidically coupled between said first tubular portion and said second tubular portion, said second tubular portion being insertable into said first tubular portion, said cap having internal threads, said second tubular portion being inserteable into said first tubular portion to such an extent that at least one corrugation of said at least one corrugated portion contacts said internal threads.

2. The fluid container of claim 1, wherein said spout assembly further includes a third tubular portion, said at least one corrugated portion including a first corrugated portion and a second corrugated portion, said first corrugated portion being connected to said first tubular portion and said third tubular portion, said second corrugated portion being connected between said second tubular portion and said third tubular portion.

3. The fluid container of claim 2, wherein said first tubular section has a first diameter, said second tubular section has a second diameter, said third tubular section has a third diameter, said second diameter being less than said first diameter.

4. The fluid container of claim 3, wherein said third diameter is less than said first diameter and said third diameter being larger than said second diameter.

5. The fluid container of claim 1, wherein said contact of said at least one corrugation with said internal threads is a flexible interference contact between said at least one corrugation and said internal threads.

6. The fluid container of claim 1, wherein said second tubular portion is configured to be substantially insertable into said first tubular portion when said cap is not secured to said opening.

7. The fluid container of claim 1, wherein said spout assembly includes a duckbill valve connected to a portion of said cap.

8. A spout assembly connectable to an opening of a fluid container, said spout assembly comprising:
   a cap securable to substantially cover said opening;
   a first tubular portion connected to said cap;
   a second tubular portion; and
   at least one corrugated portion fluidically coupled between said first tubular portion and said second tubular portion, said second tubular portion being insertable into said first tubular portion, said cap has internal threads, said second tubular portion being inserteable into said first tubular portion to such an extent that at least one corrugation of said at least one corrugated portion contacts said internal threads.

9. The spout assembly of claim 8, further comprising a third tubular portion, said at least one corrugated portion including a first corrugated portion and a second corrugated portion, said first corrugated portion being connected to said first tubular portion and said third tubular portion, said second corrugated portion being connected between said second tubular portion and said third tubular portion.

10. The spout assembly of claim 9, wherein said first tubular section has a first diameter, said second tubular section has a second diameter, said third tubular section has a third diameter, said second diameter being less than said first diameter.

11. The spout assembly of claim 10, wherein said third diameter is less than said first diameter and said third diameter being larger than said second diameter.

12. The spout assembly of claim 8, wherein said contact of said at least one corrugation with said internal threads is a flexible interference contact between said at least one corrugation and said internal threads.

13. The spout assembly of claim 8, wherein said second tubular portion is configured to be substantially insertable into said first tubular portion when said cap is not secured to said opening.

14. The spout assembly of claim 8, further comprising a duckbill valve connected to a portion of said cap.

15. A method of nesting ends of a spout assembly, comprising the steps of:
   substantially inserting a second tubular portion of a spout into a first tubular portion of the spout; and
   interfering a portion of the spout assembly with an other portion of the spout assembly to thereby retain said second tubular portion inside of said first tubular portion, said portion of the spout assembly is threads of a cap, and said other portion is a corrugation adjacent said second tubular portion.

16. The method of claim 15, wherein said second tubular portion has an outer diameter that is smaller than an inner diameter of said first tubular portion.

17. The method of claim 15, wherein said portion of the spout assembly is a distal end of said second tubular portion, and said other portion is a corrugation adjacent said first tubular portion.

* * * * *